Jan. 12, 1965  F. ETXEGOIEN  3,165,093
ROTARY INTERNAL COMBUSTION ENGINE
Filed Sept. 25, 1962  5 Sheets-Sheet 1

INVENTOR
FERNANDO ETXEGOIEN

BY Watson, Cole, Grindle & Watson
ATTORNEYS

Jan. 12, 1965     F. ETXEGOIEN     3,165,093
ROTARY INTERNAL COMBUSTION ENGINE
Filed Sept. 25, 1962     5 Sheets-Sheet 2

INVENTOR
FERNANDO ETXEGOIEN

BY *Watson, Cole, Grindle & Watson*

ATTORNEYS

Jan. 12, 1965   F. ETXEGOIEN   3,165,093
ROTARY INTERNAL COMBUSTION ENGINE
Filed Sept. 25, 1962   5 Sheets-Sheet 5

INVENTOR
FERNANDO ETXEGOIEN

BY *Watson, Cole, Grindle & Watson*

ATTORNEYS

United States Patent Office 3,165,093
Patented Jan. 12, 1965

3,165,093
ROTARY INTERNAL COMBUSTION ENGINE
Fernando Etxegoien, % Iron Mine Co. of Venezuela,
El Pao Edo, Bolivar, Venezuela
Filed Sept. 25, 1962, Ser. No. 226,130
16 Claims. (Cl. 123—16)

This invention relates to rotary internal combustion engines of the class in which a rotor having a plurality of radial pistons or vanes is disposed for rotation in unison with a relatively ecentrically disposed annulus encircling and circling the vaned rotor, with the rotor vanes projectable radially through the annulus in sealed relation for cooperation with the inner periphery of a casing to define variable volume chambers.

In the past, rotary engines of this general type have achieved both the compression of the fuel and its combustion in the outer chamber only, with the result that but a small fraction of the angular movement of the rotary engine parts could be utilized for each of the intake, compression, expansion and exhaust cycles of functions, while the inner end portion of the vanes within the annular rotor, were not employed for any useful function. Thus each cycle, including the ignition cycle of each piston could extend for only a small angular distance with respect to the total circumference of the engine and its efficiency suffered accordingly. Similarly the crowding of these various functions increased the difficulty of completely and adequately scavenging the respective working chambers after ignition of the fuel therein and of thereafter adequately compressing a fresh charge of fuel in each such chamber in readiness for ignition.

With these factors in mind, the present invention consists of such a multi-vaned engine in which the annular rotor cooperates with the hub of the vane rotor to define an inner compartment in which the fuel charges are formed and compressed and then transferred in their compressed state into the outer compartment for combustion and exhaustion, the multiple vanes thereby performing a useful function in each compartment and making available a considerably greater angular movement of the rotor vanes for carrying out each of the four cycles, namely the intake and compression of fuel within the inner chamber and its combustion and exhaust within the outer chamber. Obviously this provides increased efficiency of the engine.

A further feature of the engine consists in the novel utilization of the hub of the impeller or vaned rotor, in conjunction with the stator which supports it, to function as a valve controlling the transfer of the compressed fuel at the proper time from a subchamber within the inner compartment to a suitable preignition space in the outer compartment.

In accordance with a preferred feature of the invention the compressed charges of fuel are conducted outwardly for ignition through radial passages or conduits defined by the respective impeller blades, thereby providing a simplified fuel charge transferring mechanism and in addition utilizing the gaseous fuel for engine cooling purposes. This arrangement further utilizes the vane rotor in the manner of a centrifugal pump to augment the fuel compressing function.

A still further feature of the invention consists in the formation of the casing interior by intersecting surfaces of relatively eccentric cylinders of substantially different diameters corresponding to the external diameters of the impeller rotor and the annular rotor respectively. With this arrangement, the ends of the vanes of the impeller rotor may rotate in rubbing or wiping engagement with one such surface while the outer periphery of the annular rotor is in concentric wiping engagement with the other surface throughout a comparatively substantial area to provide an extremely effective seal between each ignited charge of material and an incoming fresh charge as well as to prevent loss of compression. Moreover in accordance with the invention this said surface of the casing concentric to the annular roller may advantageously function as a cover for outwardly opening recesses in the annular rotor to form completely enclosed preignition chambers for reception of the compressed fuel which is then carried to the ignition chamber during continued rotation of the rotors.

A further feature of this particular arrangement is that the recesses are disposed around and primarily in trailing relation to the respective vanes of the impeller rotor and the aforesaid concentric seal-forming surface of the casing is located primarily outside of the rotational path traversed by the vane tips, so that they are in effect retracted away from this surface and into the respective recesses. Thus, the radial passage openings through the respective vanes are uncovered and unobstructed to permit flow of the compressed fuel into the preignition compartment defined within each recess in conjunction with the sealing concentric portion of the casing.

A still further specific feature of the invention consists in the closing of the passages through the vanes by wiping engagement of the vanes with the said concentric portion within the firing chamber to prevent movement of the expanding charge back into the vanes.

The accompanying drawings together with the following detailed description are exemplary only, but will serve to disclose what is presently contemplated as the best mode of practicing the invention. This, of course, will involve details which may be omitted or changed as those skilled in the art will understand, without departing from the spirit or scope of the invention.

Figure 1:
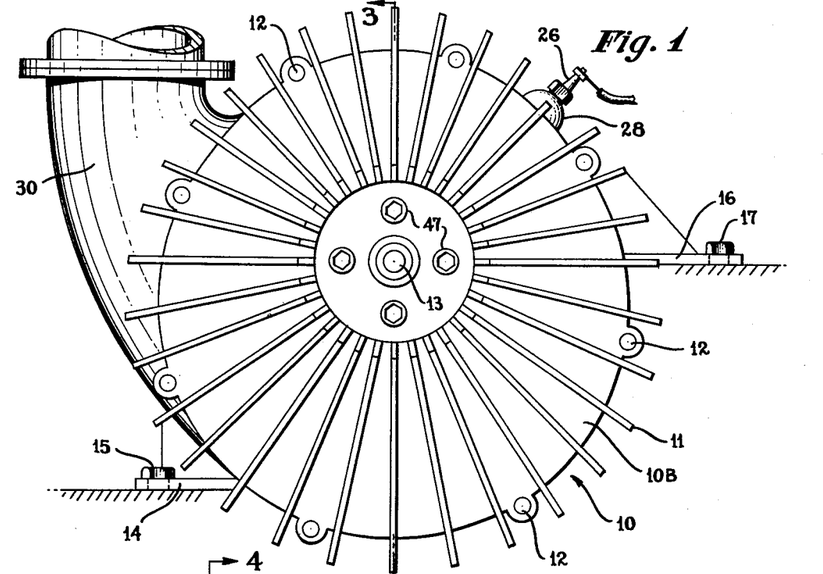
FIGURE 1 is a front elevation of an engine constructed in accordance with the preferred embodiment of the invention showing how same may be mounted on suitable supporting surfaces.
Figure 2:
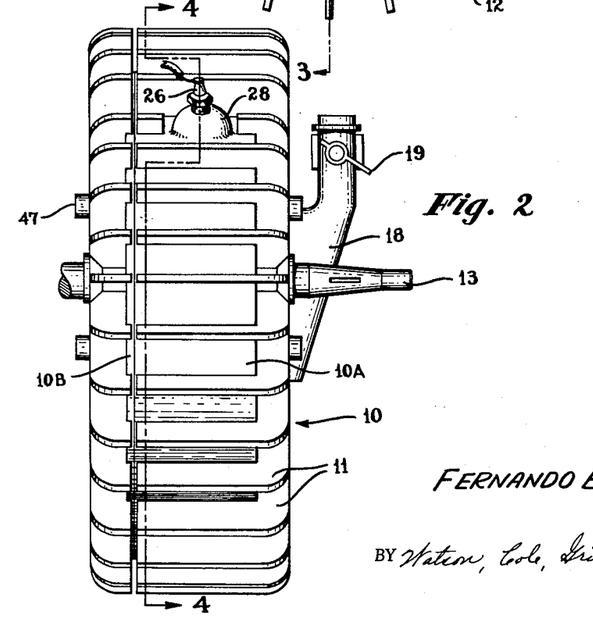
FIGURE 2 is a side elevation of the structure shown in FIGURE 1, omitting the mounting brackets and supporting surfaces.

Referring now in more detail to the accompanying drawings, and first considering FIGURES 1 and 2, it will be seen that the engine housing or casing 10 with its cooling fins 11, is formed by a pair of opposed complementary members designated as 10A and 10B, which may be removably secured together as by the bolts 12 in FIGURE 1 to permit assembly of and access to the several component parts of the engine. The numeral 13 designates the engine output shaft, while suitable engine mounts are designated by the brackets 14 and 16 adapted to be anchored by the bolts 15 and 17 to suitable supporting surfaces as indicated.

For delivering the fuel into the engine there is provided a delivery conduit or manifold, designated 18 in FIGURE 2, for delivery of a usual gaseous fuel charge, as for instance a gasoline and air mixture from a conventional carburetor, which though not illustrated, may obviously communicate with the conduit 18, the flow of fuel being regulated if desired by the valve 19.

Figure 4:
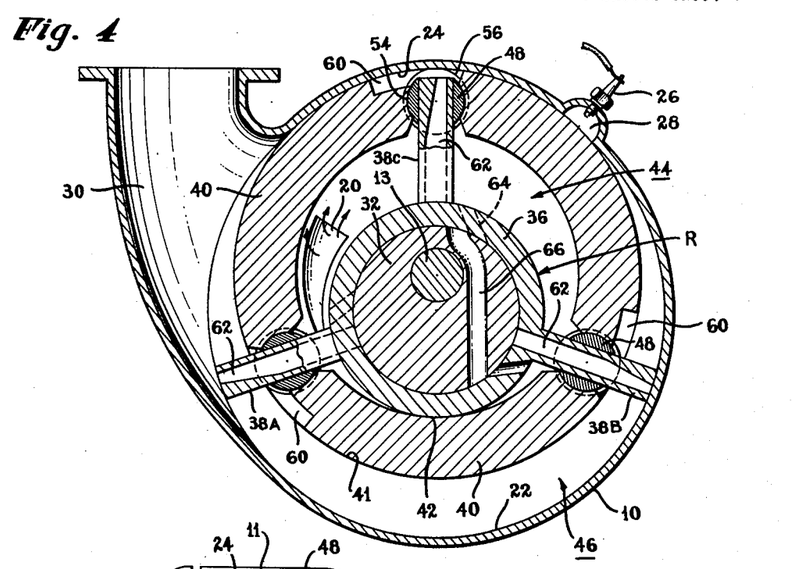
FIGURE 4 is a section on the line 4—4 of FIGURE 2.

Referring to FIGURE 4, the fuel from the intake conduit 18 is delivered into the interior of the engine through the intake port 20 for compression and distribution as hereinafter described. The interior of the casing has its periphery defined by the intersecting surfaces 22 and 24 respectively of cylinders of different diameters which are axially parallel though relatively eccentric to each other. An ignition device such as a conventional spark plug 26 is disposed with its interior end within a recess 28 in the casing interior substantially at one of the intersections of said cylindrical surfaces 22 and 24, while the exhaust passage 30 communicates with the casing interior at or adjacent the other intersection of said surfaces 22 and 24.

Figure 3:
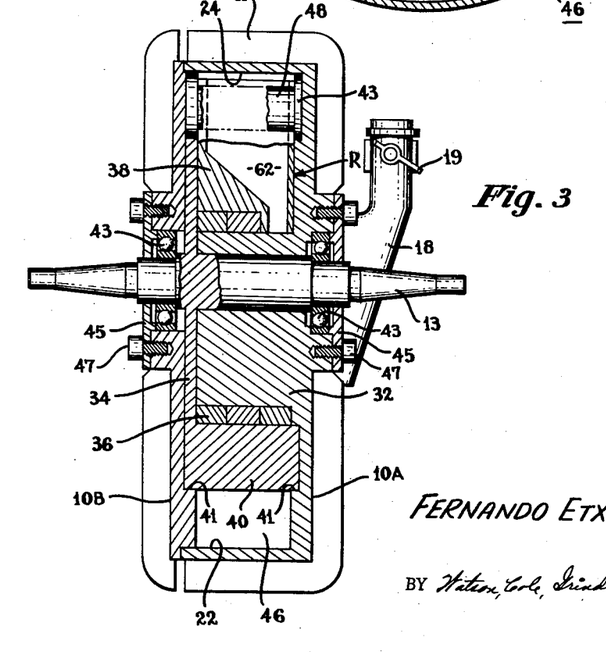
FIGURE 3 is a cross sectional view of the engine on the line 3—3 of FIGURE 1, in a plane common to the relatively spaced or eccentrically disposed axes of its rotating parts.

Fixed within the casing 10 and preferably formed integrally with the casing section 10A is a cylindrical stator 32, the cylindrical surface of which is concentric to the larger diameter inner surface 22 of the casing. In the preferred embodiment this stator 32 is fixedly supported at one axial end only from the corresponding end of the casing as defined by the casing section 10A. The other end of the stator, as is shown in FIGURE 3, is free and spaced from the other end of the casing 10B for reception of the rotor disc portion 34 as hereinafter more fully described.

An impeller rotor R has its cylindrical hub 36 rotatably journaled on the stator 32. This rotor includes a plurality of uniformly angularly spaced vanes 38A, 38B and 38C radiating from the hub into rubbing or wiping engagement with the larger diameter surface 22 in substantially fluid tight manner.

Figure 5:
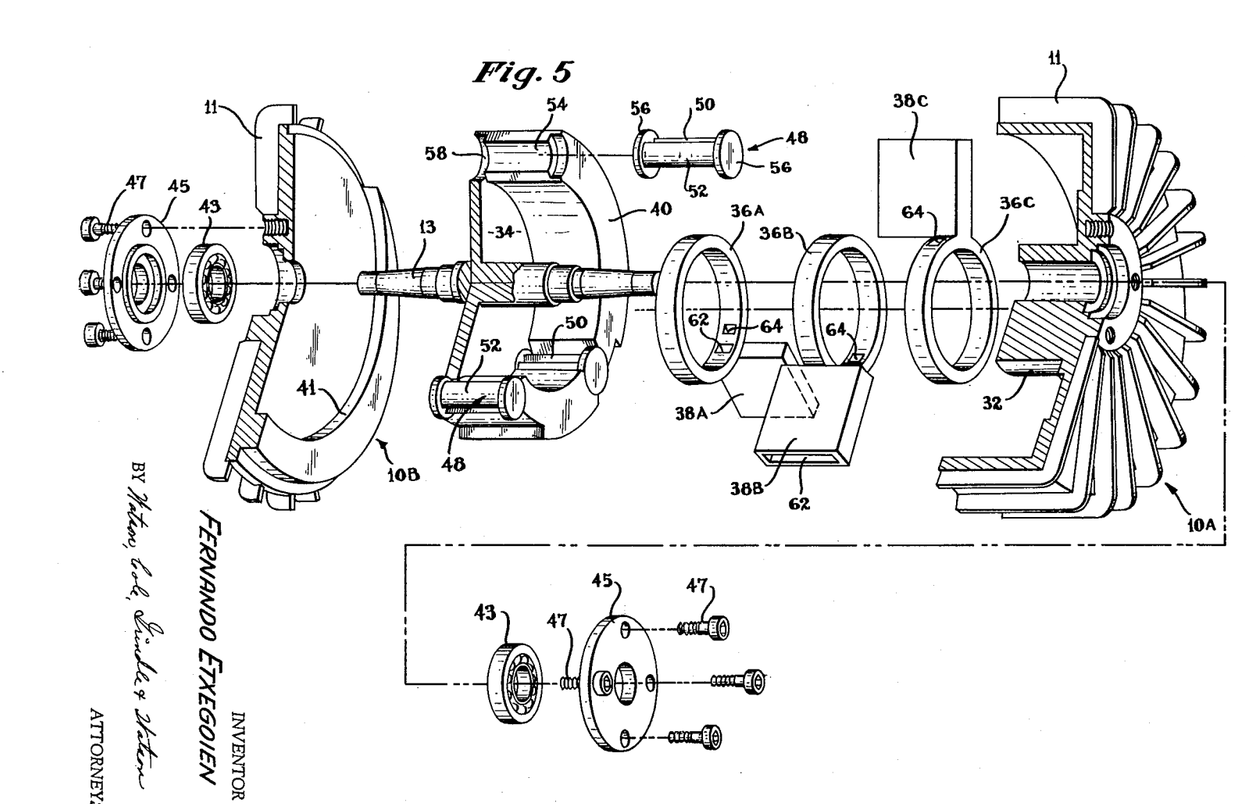
FIGURE 5 is an exploded perspective view of the several parts or elements of the invention illustrating the manner of their assembly.
Figures 6, 7:
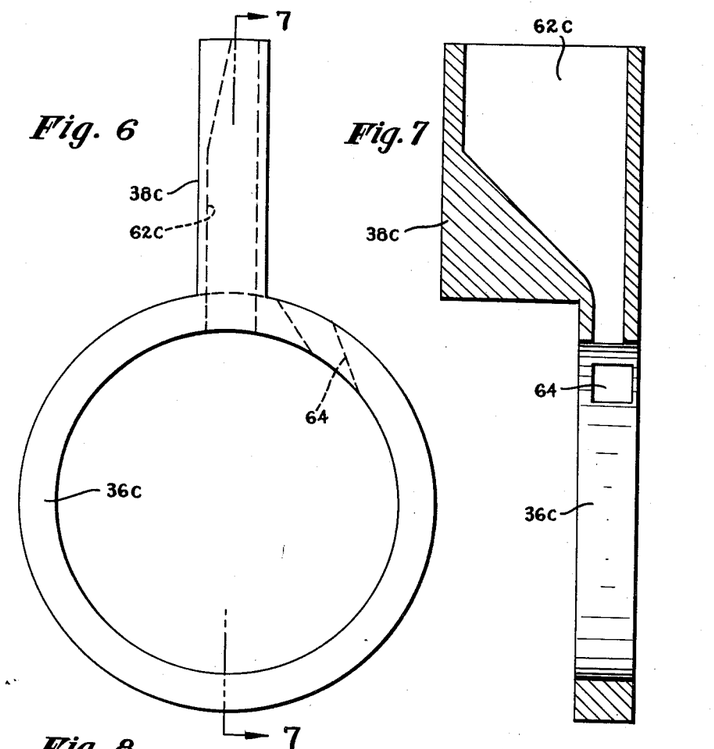
FIGURE 6 is an axial end view on an enlarged scale of one of the several separate sections of the composite impeller rotor structure of the preferred embodiment of the invention.
FIGURE 7 is a cross section through the rotor section of FIGURE 6 taken on the line 7—7 of that figure.
Figure 8:
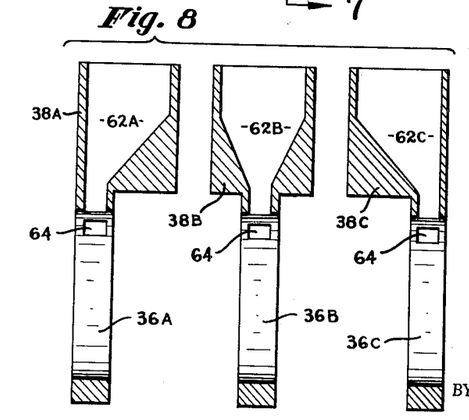
FIGURE 8 is an exploded view on a relatively reduced scale of the several sections which are assembled to form the composite impeller rotor.

Supported in the casing 10 for rotation coaxially with the smaller diameter surface 24 is the annular rotor 40 which thus rotates about an axis eccentric to that of the impeller rotor, said axis being coincident with that of the output shaft 13. In the embodiment shown the rotor is supported for rotation on the eccentric bearings 41—41 on the end faces of members 10A and 10B, all as shown in FIGURE 3 and in addition is integrally connected to the disc 34 which, as shown in FIGURE 3, extends rotatably between the free end of the stator 32 and the adjacent inner end face of the casing section 10B in rotary axial abutment with the stator. This disc 34 is fixed to the output shaft 13 and thus interconnects the rotor 40 and the output shaft 13 for rotation together. Shaft 13 is rotatably disposed through the stator, and is rotatably supported by bearings 43—43, each secured in its recess by an annular cover 45 and screw 47, as indicated in FIGURES 3 and 5.

Referring to FIGURE 4 it should be noted that the internal diameter of the rotor 40 is appreciably greater than the diameter of the hub 36 and that the inner periphery of the rotor 40 is in fluid tight wiping and rolling engagement with the outer periphery of the hub 36 to thus define a seal, as indicated at 42, along the line of engagement between these peripheries.

The outer periphery of the annular rotor or annulus 40 is in concentric wiping engagement with the smaller diameter cylindrical surface portion 24 to form a second seal of quite substantial area which will be seen to be angularly coextensive with the surface 24, between the exhaust passage 30 and the ignition device 26.

It will thus be seen that the annular rotor 40 functions as a partition dividing the hollow interior of the casing 10 into inner and outer chambers or compartments 44 and 46 respectively, which compartments by virtue of their relative eccentricity are 180° opposed to each other. The impeller vanes 38A, 38B and 38C are each radially slidably disposed through the annular rotor 40 in sealing relation therewith so that they may extend radially across both the inner and outer compartments, thereby subdividing each of these compartments into a plurality of working chambers of variable volume, each of which will alternately expand and contract incident to rotation of their rotors in a predetermined direction. This direction will normally be clockwise as viewed in FIGURE 4 and the various diagrammatic views 9 to 13 inclusive.

As is best shown in FIGURES 4 and 5 the radially slidable disposition of each vane 38A, 38B and 38C through the rotor 40 is achieved in the present embodiment by generally conventional rockable slide bearings 48 each provided with a slot 50 through which the vane is snugly slidably disposed. Each such bearing 48 is provided with relatively opposed cylindrical bearing surfaces 52 which are rockably cradled in the opposed relatively spaced arcuate sides of openings 54 through the rotor 40. As is known in the prior art the freedom for rocking motion thus afforded the bearing seals 48 is necessary in order to permit the slight angular movement of the respective vanes 38A, 38B and 38C with respect to the radius of the rotor 40 which will inevitably occur due to the relative excentricity of the two rotors R and 40. It will be seen that the side edges of the respective vanes bear against and are in sealing relation with relatively opposed end discs 56 by which the two relatively spaced bearing portions 52 are interconnected, the discs 56 being received in the counter-sunk recesses or enlargements 58 of the rotor 40.

In the illustrated embodiment of the invention the rotor 40 is provided with outwardly opening recesses or pockets 60 (FIGURE 4) extending around and predominately in trailing relation to the respective vanes 38A, 38B and 38C, the arrangement being such that these recesses 60 will be successively closed in fluid tight manner by the cylindrical surface 24, thus to successively form preignition chambers for reception of compressed charges of fuel. It will be understood that these fuel charges are successively carried into communication with the ignition device or spark plug 26, which will be energized in timed relation to rotation of the rotor R in usual manner to successively ignite the respective compressed fuel charged.

From a consideration of the structure shown in FIGURE 4, it will be apparent that during rotation in a counterclockwise direction of the two rotors the inner chamber 44 expands in a clockwise direction for one half of a revolution from its sealing engagement 42 with the hub 36. The fuel intake port 20 communicates with this expanding portion of the chamber 44 so that as each rotor vane 38A, B and C moves past the port 20, it will such that carbureted mixture of fuel and air into the compartment 44 ahead of an immediate following vane. Each vane then carries the fuel charge ahead of it through the contracting portion of the inner compartment for the next half revolution in which it is accordingly compressed, not only between relatively adjoining vanes, but preferably also is subjected to a further final compression between each vane and the seal 42 just prior to and during its transfer into one of the preignition compartments jointly defined by the recesses 60 with the surface 24.

While the charges may be thus transferred by various conventional valve and conduit systems within the broad scope of the present invention, it has been possible to achieve a number of worthwhile advantages by providing each of the rotor vanes with a radial conduit 62 extending completely therethrough from its free end into the interior of its hub 36, and to utilize hub 36 and the stator 32 as cooperating elements of a rotary valve for controlling the successive transfers of the compressed fuel charges. For this purpose, the hub 36 is provided with a generally radial port or passage 64 opening therethrough into its hollow interior, just in advance of each of the blades 38A, 38B, 38C, while the stator 32 is formed with a through passage 66 of sufficient axial extent to register with each of the relatively axially spaced ports or passages 64 and with each of the similarly axially spaced conduits or passages 62 through the vanes 38A, 38B and 38C. The opposite ends of this through passage 66 are so located with respect to the ports 64 and conduits 62 that each time a charge is fully compressed between one of the vanes 38 and the seal 42 within the inner chamber 44, the port 64 in advance of said vane 38 will move into registry with one end of the passage 66, while at the same time the conduit through a relatively trailing vane 38 will move into registry with the other end of said passage 66 whereby to provide a flow path for compressed fuel from chamber 44 into a preignition chamber 60.

As has been mentioned earlier, the production and assembly of the impeller rotor R may be considerably simplified by forming it of composite construction in the manner illustrated in FIGURE 5. In that figure it will be seen that the hub 36 is built up of the several relatively adjoining hub rings or sections 36A, 36B and 36C respectively, each of which rigidly supports one of the rotor blades or vanes 38A, 38B and 38C respectively, with the vane 38B of the middle hub section 36C axially centered thereon and the vanes 38A and 38C of the end rings offset axially to one side or the other from the plane of their respective rings so that the several vanes will be axially coextensive when the several component parts of the impeller rotor are assembled. With this arrangement the inner end of the passage or conduit 62 through each vane opens inwardly through its respective ring sections 36A, 36B, 36C.

*Operation*

The operation of the invention may be understood by tracing the course through the engine of a given charge F of fuel from its intake and compression through its ignition and exhaust from the engine, all as depicted diagrammatically in FIGURES 9 to 13, showing such a charge at the several successive stages of its progress through the engine.

Figure 9:
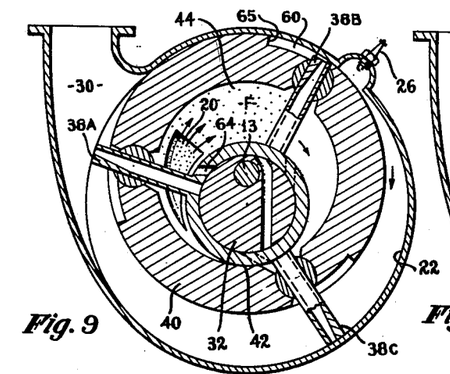
FIGURES 9 to 13 respectively are diagrammatic views, generally similar to FIGURE 4, illustrating successively the relative positions of the various parts during the various phases of the passage of a fuel charge through the engine.

As is shown in FIGURE 9 the charge F is initially drawn into the inner chamber 44 by suction which will have been created by vane 38B in its movement past intake port 20 on the expanding side of the chamber 44. This charge of fuel F will subsequently be trapped between the vane 38B and the following vane 38A as the latter moves past the port 20. As the adjoining blades 38A and 38B rotate in a clockwise direction it will be seen that the fuel charge F trapped between them will be initially compressed within the contracting or diminishing subchamber defined between them as they continue their clockwise movement toward seal 42. After the blade 38B has rotated past the seal 42 defined by the line of engagement between hub 36 and the inner periphery of annular rotor 40 the charge F will then be finally compressed in the diminishing space between the blade 38A and the seal 42 until the two rotors assume the position shown in FIGURE 10. In this position the port or passage 64 through the hub immediately in advance of the vane 38A registers with the passage 66 through the stator 32, while at the same time the conduit 62 through the relatively trailing vane 38C registers with the opposite end of passage 66. Thus the several intercommunicating passages 64, 66 and 62 provide a path through which the charge of fuel F under compression is transferred into the preignition compartment defined by recess 60 around the outer end of the vane 38C, in conjunction with the cylindrical inner surface 24 of the casing which covers this recess in fluid tight manner. Due to the excentricity of the surface 24 with respect to the path of rotation pursued by the tips of the vanes, it will be seen that at the time of fuel transfer the radial end of the vane 38C is relatively inwardly retracted or spaced from the surface 24 so that the passage 62 opening outwardly therethrough will be uncovered.

This transfer of the compressed fuel charge F occurs just before the preignition chamber or cavity 60 reaches an angular position in communication with the spark plug recess 28.

Figure 11:
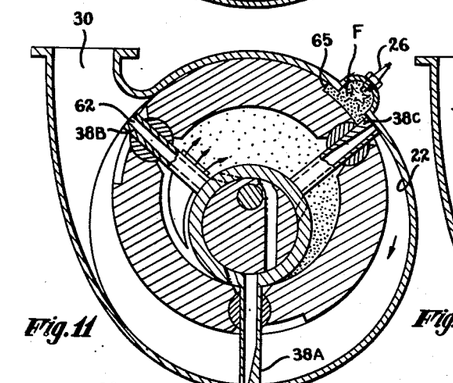

As the vane 38C moves past the spark plug recess 28 to the position shown in FIGURE 11, that recess will be caused to merge with recess 60 carrying the fuel charge F. At this time the radial tip of the blade or vane 38C, having crossed the recess 28, will make sealing contact with the inner peripheral surface 22 of the casing, at the same time being radially projected slightly beyond the outer periphery of the rotor 40 to receive the thrust of the fuel charge which at this time is exploded through energization of the spark plug 26. The plug 26 is thus energized in conventional manner each time one of the blades or vanes 38 moves past it. It will be noted that the sealing engagement of the vane tip with the surface 22 serves the dual functions of preventing escape of the exploding fuel past the vane in a circumferential direction, while closing the outer end of the passage 62 through the vane to prevent entry of the exploding fuel into that passage.

Figure 12:
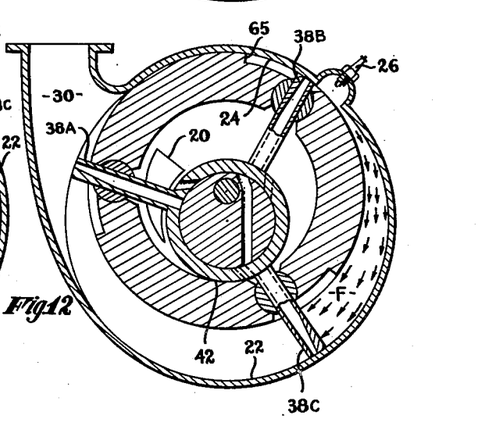

Ignition of the charge F and its ensuing expansion exerts a strong thrust urging the vane 38C in a clockwise direction toward the position shown in FIGURE 12, the vane being in wiping contact with the concentric inner periphery 22 of the casing throughout its power stroke. In FIGURE 12 the vane 38C is shown about midway of its power stroke which continues in the present embodiment for substantially a full 180°, or until the vane moves over the exhaust passage 30.

From the inception of its power stroke to about the midportion thereof, the vane 38C will be progressively projected outwardly from the annular rotor 40 to expose a continuously increasing surface to the propulsive force of the expanding charge F. At the time of initial firing of the charge F, when the parts are positioned as in FIGURE 11, the projected van surface of the vane 38C exposed to the propulsive force of the exploding charge will be but a little if any greater than the oppositely circumferentially directed surface 65 presented by the marginal wall around the adjacent preignition chamber 60. Therefore, the opposing forces of charge F tending to rotate the rotors in opposite directions may be very nearly balanced. However, at this time it must be remembered that the two rotors R and 40 will be caused to continue their clockwise rotation, both by their momentum and, except when the engine is first started, by the thrust still being exerted against the imediately preceding vane 38A which will still be undergoing its power stroke. This will be apparent from the relative positions of the vanes 38C and 38A as shown in FIGURE 11, it being apparent that in the position shown, the vane 38A will have a considerably greater area exposed to the thrust of the exploding fuel than will be vane 38C.

Figure 13:
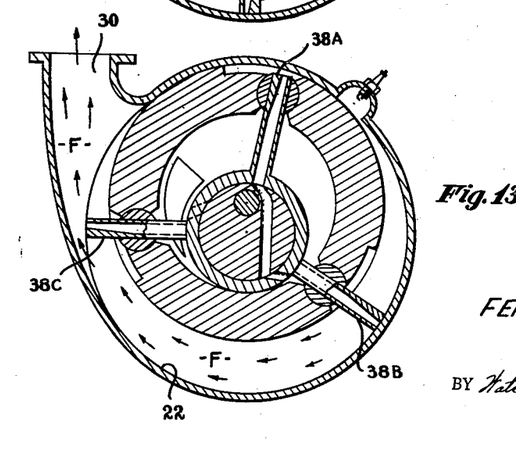

As the vane 38C moves across the exhaust passage as shown in FIGURE 13, its propulsive charge F will be exhausted both by its continuing expansion and also as a result of the sweeping or scavenging action of the immediately following vane 38B.

Figure 10:
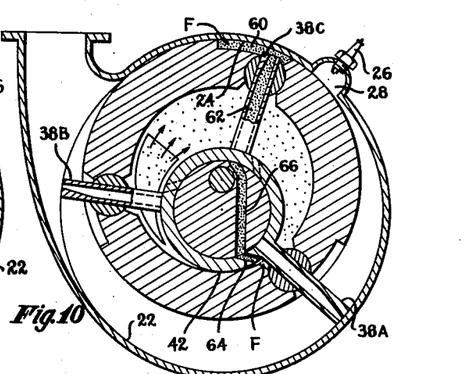

While vane 38C is thus moving across the exhaust passage, it will reach the starting position in which it is shown in FIGURE 10 after completing a full revolution. A fresh charge of compressed fuel F will again be compressed in advance of it within the chamber 44 in the manner previously described and the foregoing cycle of operation will be repeated.

This identical mode of operation occurs as to each of the vanes and the fuel charges associated therewith so that each vane 38 is subjected to a power impulse imparted by an ignited fuel charge on each revolution of the two rotors. Thus the charges will be exploded in succession behind the several vanes 38 so that each charge will be ignited while a previously exploded charge is still expanding. Thus there will be a substantial overlap in the successive power impulses which will contribute appreciably both to the power output and the smooth operation of the engine.

Not only will the fuel charges behind each blade or vane in the outer compartment 46 be successively ignited each time one of the vanes move past the spark plug, but in addition each of the three subcompartments between adjoining vanes 38 in the inner chamber 44 will draw in and compress a charge of fuel on each revolution thereof. Each charge thus compressed in the inner chamber in advance of a given vane will then be transferred rearwardly of a vane in the outer compartment 46.

The power impulses and the resulting torque imparted on the vanes 38 will be transmitted through the vanes to the annular rotor 40 and thence to the output shaft 13 to which it is fixedly secured.

It will be understood that the engine may be started in well-known manner through rotation of its output shaft 13 in a clockwise direction by conventional means such as a starter motor, a hand crank, coiled rope or the like.

By virtue of the fact that each of the two rotors is symmetrically disposed and balanced about its own fixed axis of rotation it will be readily apparent that the engine may be quite accurately balanced and that in operation it will normally be substantially free from vibrations. Moreover the engine of the preferred embodiment is capable of formation from an extremely small number of parts and is quite compact in its structure.

Having thus described my invention, I claim:

1. In a rotary internal combustion engine, the combination comprising a hollow casing, said casing having its interior defined by intersecting surfaces of axially parallel but relatively eccentric cylinders of substantially different diameters, a cylindrical stator fixed within the casing concentrically to the larger diameter surface, an impeller rotor having a cylindrical hub rotatably journaled on said stator and a plurality of uniformly angularly spaced vanes radiating from said hub into wiping engagement with said larger diameter surface, an annular rotor supported in said casing for rotation coaxially with said smaller diameter surface, with its inner periphery engaging and forming a first seal with said hub, and with its outer periphery in concentric wiping engagement with said smaller diameter surface to form a second seal, said anular rotor dividing the hollow interior of the casing into inner and outer crescentic compartments, said vanes being radially slidably disposed through and in sealing relation with said annular rotor, said vanes dividing said inner compartment into working chambers which are alternately expanded and contracted incident to rotation of said rotors, and cooperating with said first seal to compress fuel within the inner compartment, said annular rotor being provided with outwardly opening recesses in trailing relation to the respective vanes, said smaller diameter surface closing said recesses successively to form preignition chambers, means for supplying gaseous fuel into the said inner compartment at an angular location in which said working chambers are expanding, to form fuel charges which are then successively compressed between said first seal and the respective vanes, and valve controlled means for delivering the compressed fuel charges from the inner compartment sequentially into the respective preignition chambers.

2. An engine as defined in claim 1, in which said valve controlled means includes said stator and said impeller rotor, said impeller rotor being formed with an inlet port opening radially through its hub in advance of each said vane, and with a conduit extending radially through each of said vanes and opening inwardly through the inner periphery of the hub as well as outwardly through the radial tips of the vanes, said stator being formed with a through passage having its ends positioned to establish communication successively between each said inlet port and one of said conduits, the radial tips of the vanes being inwardly spaced from said small diameter surface during rotation therepast to permit free passage of the compressed fuel into the preignition chambers, and being closed by wiping engagement of the vane tips with said large diameter surface, the centrifugal action of said rotating vanes functioning to augment the compression of said fuel charges, and said fuel exerting a cooling action on the engine interior.

3. An engine as defined in claim 1, in which said stator is fixedly supported at one axial end only from the corresponding end of the casing, its other axial end being free and spaced from the other end of the casing, said other end of the casing being formed with a bearing concentric to said annular rotor, an output shaft rotatably journaled through said casing and said stator coaxially to the annular rotor, a disc rotatably disposed in said casing in rotary axial abutment with the free end of said stator, said disc interconnecting the annular rotor and the output shaft for rotation together.

4. An engine as defined in claim 3, in which said corresponding end of the casing is formed with a bearing also concentric to the annular rotor and receiving the adjacent end of said annular rotor.

5. A rotary internal combustion engine comprising a hollow casing, the interior of said casing being defined by intersecting surfaces of axially parallel but relatively eccentric cylindrical cavities of substantially different diameters, an ignition device communicating with the hollow interior of said casing adjacent one of the intersections of said surfaces, said casing being formed with an exhaust passage opening through its larger diameter surface adjacent the other intersection of said surfaces, a cylindrical stator fixed within the casing concentrically to the larger diameter surface, an impeller rotor having a cylindrical hub rotatably journaled on said stator and a plurality of uniformly angularly spaced vanes radiating from said hub into wiping engagement with said larger diameter surface, an annular rotor supported in said casing for rotation coaxially with said smaller diameter surface, with its inner periphery engaging and forming a first seal with said hub, and with its outer periphery in concentric wiping engagement with said smaller diameter surface to form a second seal, said annular rotor dividing the hollow interior of the casing into inner and outer crescentic compartments, said vanes being radially slidably disposed through and in sealing relation with said annular rotor, said annular rotor being provided with outwardly openings recesses in trailing relation to the respective vanes for successive movement into communication with said ignition device incident to rotation of said annular rotor, means for supplying gaseous fuel into said inner compartment for compression between said first seal and the respective vanes, said impeller rotor being provided with radial conduits extending from the inner periphery of its hub through the outer ends of the respective vanes into the respective recesses for delivery of fuel into said recesses, and with inlet ports opening through said hub into its inner periphery from locations adjacent and in advance of said respective vanes, said stator having passage means therethrough disposed to establish communication between each said port and one of said conduits at predetermined rotational positions of said impeller rotor.

6. A rotary internal combustion engine comprising a hollow casing, the interior of said casing having a cylindrical inner peripheral surface, an ignition device and an exhaust passage communicating with the hollow interior of said casing, a cylindrical stator fixed within the casing concentrically to the said cylindrical surface, an impeller rotor having a cylindrical hub rotatably journaled on said stator and a plurality of uniformly angularly spaced vanes radiating from said hub into wiping engagement with said cylindrical surface, an annular rotor supported in said casing for rotation about an axis eccentric to that of said cylindrical surface, with its inner periphery engaging and forming a first seal with said hub, and with its outer periphery in concentric wiping engagement with the inner periphery of said hollow interior to form a second seal, said annular rotor dividing the hollow interior of the casing into inner and outer crescentic compartments, said vanes being radially slidably disposed through and in sealing relation with said annular rotor, means for supplying gaseous fuel into said inner compartment for compression between said first seal and the respective vanes, said impeller rotor being provided with radial conduits extending from the inner periphery of its hub and each opening through the outer ends of the respective vanes into said outer crescentic compartment, and with inlet ports opening through said hub into its inner periphery from locations adjacent and in advance of said respective vanes, said stator having passage means therethrough disposed to establish communication between each said port and one of said conduits at predetermined rotational positions of said impeller rotor.

7. A rotary internal combustion engine as defined in claim 8, in which said annular rotor is provided with outwardly opening recesses in trailing relation to the respective vanes.

8. In a rotary internal combustion engine the combination comprising a hollow casing having an interiorly presented cylindrical surface, a cylindrical stator fixed within the casing coaxially to and radially inwardly from said surface, an impeller rotor having a cylindrical hub rotatably journaled on said stator and a plurality of angularly spaced vanes radiating from said hub into rubbing engagement with said cylindrical surface, an annulus within the casing encircling said hub eccentrically thereto, said annulus being supported for rotation about its own center and in wiping engagement with the said cylindrical surface, said annulus dividing the space between said hub and said surface into inner and outer crescentic compartments, said vanes being radially slidably disposed through and in sealing relation with said annulus and interconnecting said rotor and said annulus for rotation in unison, means for supplying fuel into said inner compartment for compression therein, and means for transferring compressed charges of fuel from said inner compartment to said outer compartment, said means including conduits defined by said respective vanes.

9. An internal combustion engine as defined in claim 8, in which said hub and said stator are provided with passage disposed to control the entrance of fuel to said conduits.

10. An internal combustion engine as defined in claim 8, in which the inner periphery of said annulus is in wiping engagement with said hub.

11. A rotary internal combustion engine comprising a hollow casing, the interior of said casing being defined by intersecting surfaces of axially parallel but relatively eccentric cylindrical cavities of substantially different diameters, an ignition device communicating with the hollow interior of said casing adjacent one of the intersections of said surfaces, said casing being formed with an exhaust passage opening through its larger diameter surface adjacent the other intersection of said surfaces, a cylindrical stator fixed within the casing concentrically to the larger diameter surface, an impeller rotor having a cylindrical hub rotatably journaled on said stator and a plurality of uniformly angularly spaced vanes radiating from said hub into wiping engagement with said larger diameter surface, an annular rotor supported in said casing for rotation coaxially with said smaller diameter surface, with its inner periphery engaging and forming a first seal with said hub, and with its outer periphery in concentric wiping engagement with said smaller diameter surface to form a second seal, said annular rotor dividing the hollow interior of the casing into inner and outer crescentic compartments, said vanes being radially slidably disposed through and in sealing relation with said annular rotor, said annular rotor being provided with outwardly opening recesses in trailing relation to the respective vanes, means for supplying gaseous fuel into said inner compartment for compression between said first seal and the respective vanes, and means for conveying said compressed fuel at timed intervals into the outer compartment between said second seal and said ignition device.

12. In a rotary internal combustion engine the combination comprising a hollow casing, the interior of said casing being defined by intersecting surfaces of axially parallel but relatively eccentric cylindrical cavities of substantially different diameters, an ignition device communicating with the hollow interior of said casing adjacent one of the intersections of said surfaces, said casing being formed with an exhaust passage opening through its larger diameter surface adjacent the other intersection of said surfaces, a cylindrical stator fixed within the casing concentrically to the larger diameter surface, an impeller rotor having a cylindrical hub rotatably journaled on said stator and a plurality of uniformly angularly spaced vanes radiating from said hub into wiping engagement with said larger diameter surface, an annular rotor supported in said casing for rotation coaxially with said smaller diameter surface, with its inner periphery engaging and forming a first seal with said hub, and with its outer periphery in concentric wiping engagement with said smaller diameter surface to form a second seal, said annular rotor dividing the hollow interior of the casing into inner and outer crescentic compartments, said vanes being radially slidably disposed through and in sealing relation with said annular rotor, said annular rotor being provided with outwardly opening recesses in trailing relation to the respective vanes, means for supplying gaseous fuel into said inner compartment for compression between said first seal and the respective vanes, said vanes being formed to define radial fuel conduits communicating with the said outwardly opening recesses in the rotor, and valve means for periodically placing said radial fuel conduits in communication with said inner compartment.

13. In a rotary internal combustion engine, the combination comprising a hollow casing, the interior of said casing being defined by intersecting surfaces of axially parallel but relatively eccentric cylindrical cavities of substantially different diameters, an ignition device communicating with the hollow interior of said casing adjacent one of the intersections of said surfaces, said casing being formed with an exhaust passage opening through its larger diameter surface adjacent the other intersection of said surfaces, a cylindrical stator fixed within the casing concentrically to the larger diameter surface, an impeller rotor having a cylindrical hub rotatably journaled on said stator and a plurality of uniformly angularly spaced vanes radiating from said hub into wiping engagement with said larger diameter surface, an annular rotor supported in said casing for rotation coaxially with said smaller diameter surface, with its outer periphery in concentric wiping engagement with said smaller diameter surface to form a seal, said annular rotor dividing the hollow interior of the casing into inner and outer crescentic compartments, said vanes being radially slidably disposed through and in sealing relation with said annular rotor.

14. In a rotary internal combustion engine the combination comprising a hollow casing, vaned rotor means including an annular rotor disposed for rotation in said chamber, said casing having an interiorly presented cylindrical surface portion concentric to and in wiping engagement with a sector only of the outer periphery of said annular rotor, said rotor and said casing jointly defining an ignition chamber circumferentially adjoining said surface portion, said annular rotor being formed with an outwardly opening recess in its outer periphery to be periodically closed by said surface during rotation of the said annular rotor, and means for supplying compressed gaseous fuel into such recess while it is thus closed.

15. In a rotary internal combustion engine the combination as defined in claim 14, including a radial impeller vane disposed for rotary movement with said annular rotor and for radial sliding movement through said annular rotor within said recess, said vane having a fuel passage therethrough for communication with said recess, means for retracting the outer end of the vane into said recess during its rotary movement past said surface, and for projecting it radially outwardly from the annular rotor into said ignition chamber during its rotary movement through the latter.

16. A rotary internal combustion engine as defined in claim 15, in which said fuel passage opens radially outwardly through the tip of said vane, said tip being in wiping engagement with the inner periphery of said ignition chamber during its movement through said chamber.

References Cited by the Examiner

UNITED STATES PATENTS

| | | | |
|---|---|---|---|
| 767,028 | 8/04 | Wood | 103—144 |
| 812,688 | 2/06 | Sharp | 230—157 |
| 891,372 | 6/08 | Reichhelm | 230—157 |
| 1,004,696 | 10/11 | Schoeck | 123—16 |
| 1,270,522 | 6/18 | Jacobsen | 103—144 |
| 1,535,275 | 4/25 | Westin | 103—144 |
| 2,037,450 | 4/36 | Bancroft | 123—16 |
| 2,071,799 | 2/37 | Mabille | 230—157 |
| 2,682,258 | 6/54 | Udelman | 123—16 |

FOREIGN PATENTS 14,458    1912    Great Britain.

JOSEPH H. BRANSON, Jr., *Primary Examiner.*
WILBUR J. GOODLIN, *Examiner.*